United States Patent
Degand et al.

(10) Patent No.: US 7,019,260 B1
(45) Date of Patent: *Mar. 28, 2006

(54) AUTOMOTIVE GLAZING PANEL WITH SOLAR CONTROL COATING COMPRISING A DATA TRANSMISSION WINDOW

(75) Inventors: Etienne Degand, Jurnet (BE); Christophe Maza, Jurnet (BE)

(73) Assignee: Glavarbel, (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/926,519

(22) PCT Filed: May 1, 2000

(86) PCT No.: PCT/EP00/04199

§ 371 (c)(1),
(2), (4) Date: Nov. 30, 2001

(87) PCT Pub. No.: WO00/72634

PCT Pub. Date: Nov. 30, 2000

(30) Foreign Application Priority Data

May 20, 1999 (EP) .................................. 99201566

(51) Int. Cl.
  *H05B 3/86* (2006.01)
  *B60S 1/02* (2006.01)
(52) U.S. Cl. ..................................... 219/203; 219/543
(58) Field of Classification Search ................ 219/203, 219/522, 543, 541; 52/171.2; 338/306–309
See application file for complete search history.

(56) References Cited

U.S. PATENT DOCUMENTS

| | | | |
|---|---|---|---|
| 3,366,777 A | * 1/1968 | Brittan et al. | ............... 219/203 |
| 3,902,040 A | * 8/1975 | Ikeda et al. | .................. 219/203 |
| 4,023,008 A | 5/1977 | Durussel | |
| 4,196,338 A | 4/1980 | Edel | |
| 4,213,028 A | 7/1980 | Wolf | |
| 4,668,270 A | * 5/1987 | Ramus | ......................... 65/106 |
| 4,743,741 A | * 5/1988 | Ramus | |
| 4,910,380 A | 3/1990 | Reiss et al. | |
| 5,012,255 A | * 4/1991 | Becker | ....................... 343/704 |
| 5,354,966 A | * 10/1994 | Sperbeck | ..................... 219/203 |
| 5,552,780 A | * 9/1996 | Knockeart | ................... 340/991 |
| 5,846,854 A | 12/1998 | Giraud et al. | |
| 5,898,407 A | * 4/1999 | Paulus et al. | ................. 343/713 |
| 5,960,572 A | * 10/1999 | DeVito | ......................... 40/593 |
| 6,072,436 A | * 6/2000 | Marougi | ...................... 343/713 |
| 6,132,881 A | 10/2000 | Hartig et al. | |
| 6,185,812 B1 | 2/2001 | Castle et al. | |
| 6,559,419 B1 | * 5/2003 | Sol et al. | ...................... 219/203 |
| 6,670,581 B1 | * 12/2003 | Degand et al. | ............. 219/203 |
| 6,734,396 B1 | * 5/2004 | Sol et al. | ...................... 219/203 |
| 6,765,177 B1 | * 7/2004 | Noguchi et al. | ............. 219/203 |

(Continued)

FOREIGN PATENT DOCUMENTS

DE 3708577 * 9/1988

(Continued)

*Primary Examiner*—John A. Jeffery
(74) *Attorney, Agent, or Firm*—Akerman Senterfitt

(57) ABSTRACT

An automotive glazing panel has an electrically heatable solar control coating layer, spaced first and second bus bars positioned respectively adjacent a first and a second side edge of the glazing panel and adapted to relay electrical power to the coating layer and a data transmission window positioned adjacent the top edge of the glazing. This arrangement may be used to alleviate or reduce perturbations to heating of the glazing panel caused by the presence of the data transmission window.

7 Claims, 2 Drawing Sheets

U.S. PATENT DOCUMENTS 6,946,622 B1 * 9/2005 Degand ............ 219/203
2004/0026397 A1 * 2/2004 Degand ............ 219/203

FOREIGN PATENT DOCUMENTS

| | | | |
|---|---|---|---|
| DE | 4019703 | * | 7/1991 |
| DE | 19513263 | * | 10/1996 |
| EP | 378917 | * | 7/1990 |
| EP | 401754 | * | 12/1990 |
| EP | 726232 | * | 8/1996 |
| EP | 876083 | * | 11/1998 |
| FR | 2737075 | * | 1/1997 |
| GB | 2186769 | * | 8/1987 |
| GB | 2381179 | * | 4/2003 |
| JP | 61-16153 | * | 1/1986 |
| JP | 2-46683 | * | 2/1990 |
| JP | 3-281461 | * | 12/1991 |
| WO | 9110564 | * | 7/1991 |
| WO | 0726232 A2 | | 8/1996 |

* cited by examiner

AUTOMOTIVE GLAZING PANEL WITH SOLAR CONTROL COATING COMPRISING A DATA TRANSMISSION WINDOW

This application is the U.S. national stage of International Application No. PCT/EP00/04199 filed May 1, 2000 which claims priority from European Patent Application No. 99201566.9 filed May 20, 1999. The entirety of each of those applications is incorporated herein by reference.

BACKGROUND OF THE INVENTION

This invention relates to glazing panels and particularly but not exclusively to vehicle windscreens provided with electrically heatable coating stacks.

Whilst the primary role of a vehicle windscreen is to permit good visibility for a driver, various additional features may be incorporated into its design. Sensors or emitters arranged inside the vehicle may rely on electromagnetic data transmission through the windscreen. For example, passage of an electromagnetic data signal for automatic payment at the toll barriers used on the French motorway system may pass through the windscreen. It is also known to provide a window in the band of black enamel around the periphery of the windscreen, usually along the bottom edge of the windscreen, through which a vehicle identification number or chassis number, often in the form of a bar code, can be read from the outside of the vehicle.

U.S. Pat. No. 4,668,270 (Ford Motor Company) describes a car windscreen having an electrically heatable coating layer used for defrosting, de-iceing and/or de-misting. The heatable coating, which is laminated between the two glass sheets of the windscreen, is supplied with electrical power via first and second bus bars which extend respectively along the top and bottom edges of the windscreen, each bus bar being silk screen printed on the glass in a silver ceramic material. The heatable coating is a multilayer coating consisting of layers of zinc oxide and silver formed by magnetron sputtering.

Coating layers are well know not only to provide an electrically heatable element but also to modify the optical properties of the glass, particularly to reduce the proportion of incident solar energy which is transmitted through the glass whilst allowing passage of sufficient visible light to ensure good visibility. This can reduce overheating of the interior of the vehicle in summer and is commonly achieved by reflection of incident solar radiation in the infra-red portion of the spectrum. EP378917A (Nippon Sheet Glass Co.) discloses such coating layers. The term solar control coating layer as used herein refers to a coating layer which increases the selectivity of the glazing panel i.e. the ratio of the proportion of incident visible radiation transmitted through the glazing to the proportion of incident solar energy transmitted through the glazing. Many solar control coating layers have the intrinsic property of being electrically heatable.

When a solar control coating is provided on a windscreen it is advantageous for the solar control coating to cover the entire light transmitting portion of the windscreen so as to reflect as much of the incident solar energy as possible. A data transmission window in the form of a gap or hole may be provided in a solar reflecting coating layer specifically to allow the passage of electromagnetic waves through that portion of the glazing, for example to a sensor or emitter. One example of this, as referred to above, is to allow passage of an electromagnetic data signal for automatic payment at the toll barriers used on the French motorway system. The principle is nevertheless applicable to allowing passage of any electromagnetic data transmission signal through a glazing panel, particularly using infra-red wavelengths. The term data transmission window as used herein refers to a portion of the surface area of a glazing adapted to permit electromagnetic data transmission therethrough.

SUMMARY OF THE INVENTION

The invention allows a heatable solar control coating layer to be combined with a data transmission window in a particularly advantageous way.

The data transmission window may be substantially a four-sided polygon. Preferably, the data transmission window is not electrically coupled to an electrical element.

In one form, the data transmission window may have at least three sides surrounded by the solar control coating layer.

For aesthetic reasons and so as not to impair the driver's vision the bus bars of a heatable coating layer of a car windscreen are usually arranged out of view. It has been common practice for bus bars to be arranged along the top and bottom edges (i.e. the longer two edges of a car windscreen) hidden from the inside of the car by the dashboard and the interior bodywork and hidden from the outside by a band of black enamel (which may have the additional role of blocking solar radiation to prevent deterioration of underlying glue securing the windscreen to the car bodywork). This arrangement has been used to provide a suitable distance and thus an appropriate electrical resistance between the bus bars so as to allow a suitable electrical power to be dissipated in the coating layer to provide the desired heating effect.

Data transmission windows in solar energy reflecting windscreens have generally been arranged towards the top edge of the windscreen, roughly centrally between the two side edges. This may facilitate orientation and positioning of data transmitting and/or receiving instruments.

The inventors have appreciated that simply combining these two known techniques is undesirable as positioning of the data transmission window in close proximity to the upper bus bar results in a significant gap or non-conducting portion adjacent to the bus bar and increased risk of provoking uneven heating and undesirable hot spots in the coating layer.

This problem may be resolved by the invention without requiring repositioning of the data transmission window or fundamental redesigning of either this or the bus bars.

The combination of the data transmission window with the bus bars arranged along the side edges of the windscreen may significantly reduce the perturbation to the flow of electrical current in the coating layer caused by the presence of the data transmission window.

In prior art arrangements having a substantially horizontal bus bar arranged along the top edge of a windscreen, this bus bar must either be connected to an electrical supply by a connector at the top edge of the windscreen or the bus bar must be brought down one side of the windscreen (avoiding contact with the electrically conducting coating layer) so as to allow arrangement of an electrical connector at the bottom edge of the windscreen. Arranging the bus bars adjacent to the side edges of the glazing may help to avoid this problem by allowing for connection at or adjacent to the bottom edge of the windscreen.

Arrangement of the data transmission window in an elongate form may facilitate positioning of data transmitting and/or receiving instruments and passage of data signals.

Arranging the elongation along the top or bottom edge of the glazing panel in combination with the defined bus bar arrangement enables a desired surface area for the data transmission window to be selected whilst reducing the width of the interruption in the coating layer between the two bus bars. This may be used to minimise the perturbation of current flow in the coating layer when electrically heated.

The data transmission window preferably has a width comprised between 50 mm and 100 mm, and a length comprised between 80 mm and 210 mm.

The data transmission window may have a width of at least 50 mm, 60 mm, 70 mm, 80 mm, 90 mm or 100 mm. It may have a width of less than 300 mm, 250 mm, 200 mm, 150 mm or 100 mm.

The data transmission window may have a length of at least 80 mm, 100 mm, 120 mm, 140 mm, 160 mm, 180 mm or 210 mm. It may have a length of less than 400 mm, 350 mm, 300 mm, 250 mm or 210 mm.

DETAILED DESCRIPTION

An embodiment of the invention will now be described, by way of example only, with reference to FIG. 1 and FIG. 2, both of which are expanded schematic views of a car windscreen.

Figure 1:
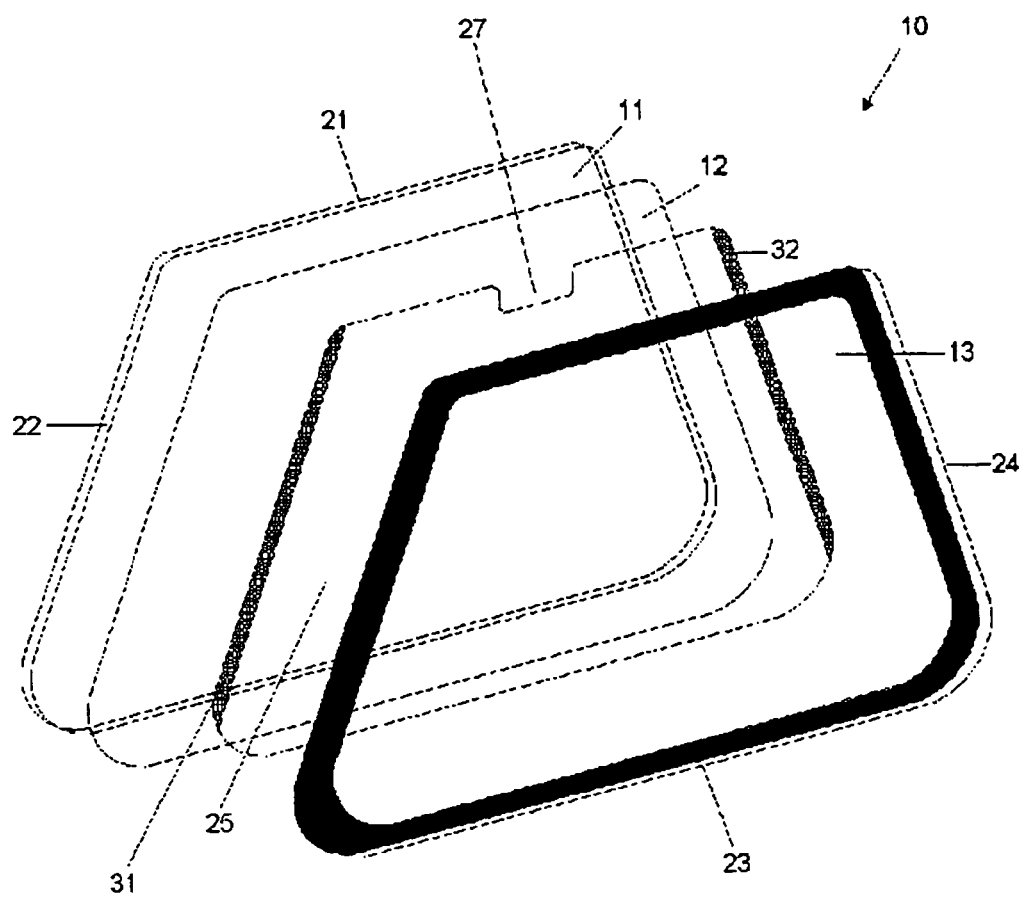
FIG. 1 is an expanded schematic view of a car windscreen.

Windscreen 10 illustrated in FIG. 1 comprises an inner sheet of glass 11 laminated to an outer sheet of glass 13 by means of a sheet of pvb 12.

The windscreen is substantially trapezial in shape having a top edge 21, a longer bottom edge 23 substantially parallel thereto and side edges 22, 24. The windscreen has a spherical, curved configuration so that it is curved both along an axis parallel to the top edge 21 and along an axis perpendicular to the top edge 21 (for ease of representation the curvature of the windscreen is not shown).

An electrically conducting solar control layer 25 is positioned between the inner and outer sheets of glass 11, 13. Typically this is a multi-layer coating having the general configuration antireflective dielectric layer/silver containing layer/antireflective dielectric layer/silver containing layer/antireflective dielectric layer deposited by sputtering. The coating layer may be carried for example on the inner face of the outer-sheet of glass 13 (i.e. face 2) or on a supporting film, for example of PET.

The coating layer 25 is spaced from the external periphery of the windscreen by a non-conducting peripheral band (not shown) provided in this example by a band in which the coating layer has either not been deposited or has been removed. This prevents the electrically conductive coating extending to the very edge of the windscreen and may also reduce the risk of corrosion of the coating layer.

A data transmission window 27 is provided as part of the glazing panel within the coating layer. In the example of FIG. 1, the data transmission window 27 is partially surrounded by the coating layer 25 but in other embodiments it may be entirely surrounded. The data transmission window may be formed by removing a portion of the coating layer or by masking when the coating layer is deposited.

Electrical power is supplied to the coating layer via a first bus bar 31 arranged in contact with the coating layer 25 adjacent to the first side edge 22 of the windscreen and a second bus bar 32 arranged in contact with the coating layer 25 adjacent to the second side edge 23 of the windscreen. The bus bars may be formed in any suitable manner, for example by silk screen printing of a conducting enamel material underneath or on top of the coating layer or by means of conducting tape or conductive strips, for example conductive copper or tinned copper strips. Connectors (not shown) for facilitating connection of the bus bars to a car's electrical circuit may protrude from the glazing and may be arranged adjacent to each other (not shown).

Figure 2:
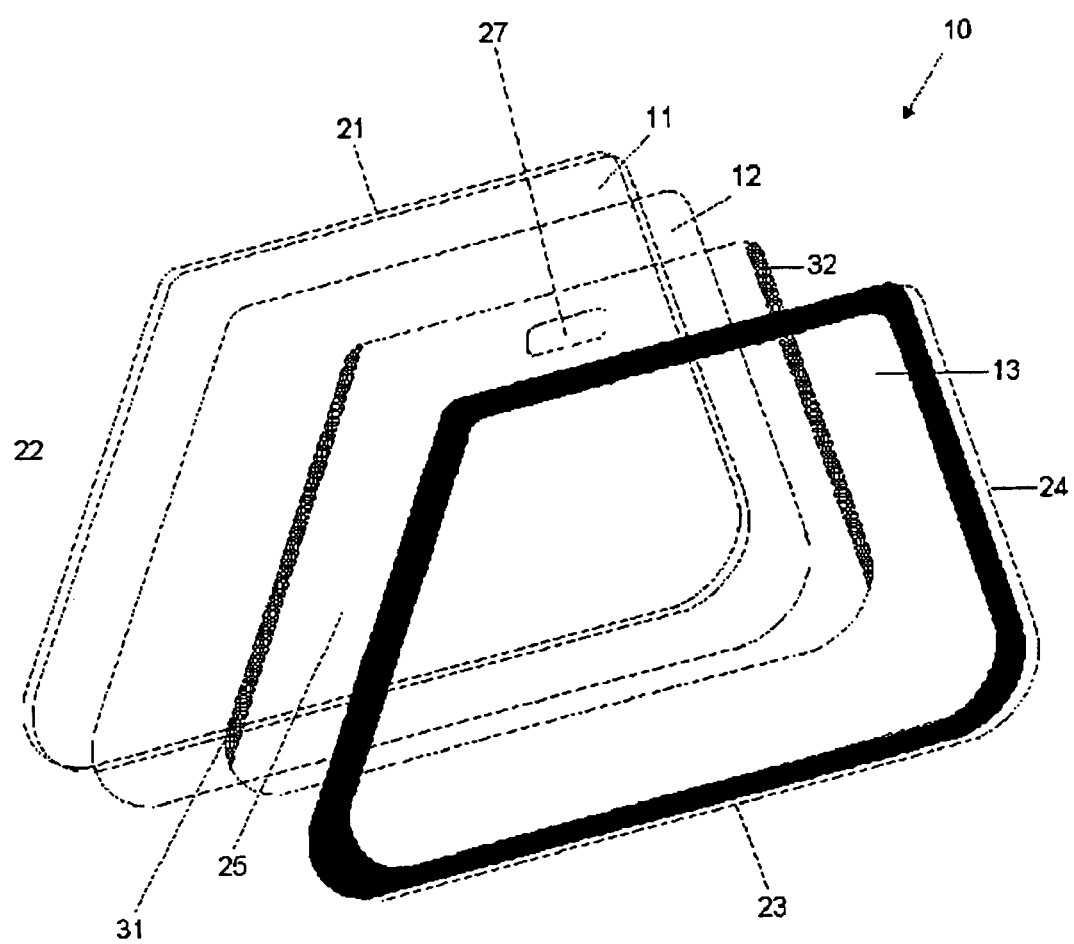
FIG. 2 is an expanded schematic view of a car windscreen.

In FIG. 2, the data transmission window 27 is entirely surrounded by the coating layer 25.

Each of these arrangements may be used to allow the coating layer to cover at least the majority of the light transmitting surface of the windscreen without provoking significant perturbation in the heating arrangement of the coating layer.

Whilst the invention has been particularly described in relation to a windscreen it will be understood that it is applicable to other automotive glazing panels, for example, side windows, rear windows and sunroofs.

What is claimed is:

1. An automotive windscreen glazing panel in which the glazing panel perimeter comprises at least a top edge, a bottom edge and first and second side edges, the bottom edge being longer than the top edge and substantially parallel thereto and each of the side edges being substantially the same length as each other and shorter than the top edge,
    in which the glazing panel is provided with an electrically heatable solar control coating layer over at least part of its surface area,
    in which the glazing panel is provided with a data transmission window adapted to permit electromagnetic data transmission therethrough,
    in which the data transmission window permits transmission of a greater proportion of incident electromagnetic data than the proportion of incident electromagnetic data transmitted by an equivalently sized portion of the glazing panel provided with the solar control coating,
    in which the data transmission window is at least in part surrounded by the coating layer and is positioned adjacent to either the top edge or the bottom edge of the glazing panel,
    in which the first bus bar is arranged substantially adjacent to and extends substantially along the first side edge of the glazing panel, and
    in which the second bus bar is arranged substantially adjacent to and extends substantially along the second side edge of the glazing panel,
    in which the arrangement of the solar control coating, the bus bars and the data transmission window is such as to allow the coating layer to cover at least the majority of the light transmitting surface of the windscreen without provoking significant perturbation in the heating arrangement of the coating layer.

2. The automotive glazing panel in accordance with claim 1, the glazing panel having one of the following:
    (a) the data transmission window is positioned adjacent the top edge of the glazing panel;
    (b) the data transmission window is positioned adjacent the bottom edge of the glazing panel.

3. The automotive glazing panel in accordance with claim 2 and further including at least one of the following:
    (c) the data transmission window is substantially elongate in shape with its elongation stretching substantially parallel to the top edge of the glazing panel;

(d) the data transmission window is substantially elongate in shape with its elongation stretching substantially parallel to the bottom edge of the glazing panel;
(e) the data transmission window is at least partially surrounded by the coating layer;
(f) the data transmission window is substantially surrounded by the coating layer;
(g) the minimum distance between the periphery of the data transmission window and either of the first bus bar or second bus bar is at least 300 mm;
(h) the data transmission window has a width which is at least 50 mm and which is less than 300 mm and a length which is at least 80 mm and which is less than 400 mm;
(i) the data transmission window has a width comprised between 50 mm and 100 mm and a length comprised between 80 mm and 210 mm.

4. A method of controlling heat dissipation over at least a part of the surface area of an automotive glazing panel comprising providing a glazing panel made in accordance with claim 2.

5. A method in accordance with claim 4 in which the heat dissipation is controlled substantially evenly over a majority of the surface area of the glazing panel.

6. A method of controlling heat dissipation over at least a part of the surface area of an automotive glazing panel comprising providing a glazing panel made in accordance with claim 1.

7. A method in accordance with claim 6 in which the heat dissipation is controlled substantially evenly over a majority of the surface area of the glazing panel.

* * * * *